United States Patent [19]

Yokoo

[11] Patent Number: 4,984,109
[45] Date of Patent: Jan. 8, 1991

[54] REEL SUPPORT POSITIONING DEVICE FOR A CASSETTE TAPE RECORDING AND/OR REPRODUCING APPARATUS ACCOMMODATING CASSETTES OF DIFFERENT SIZES

[75] Inventor: Shouzou Yokoo, Katsuta, Japan

[73] Assignee: Hitachi, Ltd., Tokyo, Japan

[21] Appl. No.: 365,123

[22] Filed: Jun. 12, 1989

[30] Foreign Application Priority Data

Jun. 15, 1988 [JP] Japan .................................. 63-145702
Dec. 23, 1988 [JP] Japan .................................. 63-323288
Mar. 10, 1989 [JP] Japan .................................. 1-56407
Apr. 12, 1989 [JP] Japan .................................. 1-90701

[51] Int. Cl.$^5$ ............................................. G11B 15/00
[52] U.S. Cl. ..................................... 360/94; 360/96.3; 360/95; 242/199
[58] Field of Search ..................... 360/92-94, 360/137, 96.5-96.6; 206/387; 242/198-199, 200, 201; 74/89.15, 665 GD

[56] References Cited

U.S. PATENT DOCUMENTS

| 4,664,337 | 5/1987 | Shiratori | 360/94 |
| 4,787,572 | 11/1988 | Rademacher | 360/94 |
| 4,873,593 | 10/1989 | Baranski | 360/94 |

FOREIGN PATENT DOCUMENTS

| 60-40546 | 3/1984 | Japan . | |
| 60-95751 | 5/1985 | Japan . | |
| 60-182551 | 9/1985 | Japan | 360/94 |
| 61-85657 | 5/1986 | Japan | 360/94 |
| 62-92154 | 4/1987 | Japan . | |
| 62-292153 | 4/1987 | Japan . | |
| 62-97163 | 5/1987 | Japan . | |

OTHER PUBLICATIONS

SMPTE 130th Technical Conference, Oct. 15-18, 1988, Reprint No. 130-19, "Mechanical Considerations for Composite Digital" VCR by Kaku.
IREJ Technical Report vol. 12, No. 56, pp. 31-36, VR 188-60 Dec. 1988.

Primary Examiner—John H. Wolff
Assistant Examiner—Alfonso Garcia
Attorney, Agent, or Firm—Antonelli, Terry, Stout & Kraus

[57] ABSTRACT

A reel position device for shifting reel supports, on which reels are mounted, corresponding to diameters of the reels of plural different sizes and/or distances between the reels and for positioning and holding the reel supports at a predetermined position, and a magnetic recording apparatus usign such reel support shifting device, wherein one end of each of operation members for shifting the reel supports is rotatably engaged by a corresponding pivot shaft arranged at a predetermined radial position of each of rotary members driven by a motor. The other end of said operation member is engaged by a guide in a reel support shifting structure and by a guide slot formed in a fixed part of the device. A positioning and holding mechanism such as a V-shaped notch is provided in each guide slot. Positioning and holding forces are obtained from elastic members such as springs connected to the rotary members. By rotating the rotary members, one end of each operation member is rotated and the other end thereof shifts the corresponding reel support. The operation members abut against regulating members, whereby the ends of the operation member are urged against guide surfaces.

32 Claims, 13 Drawing Sheets

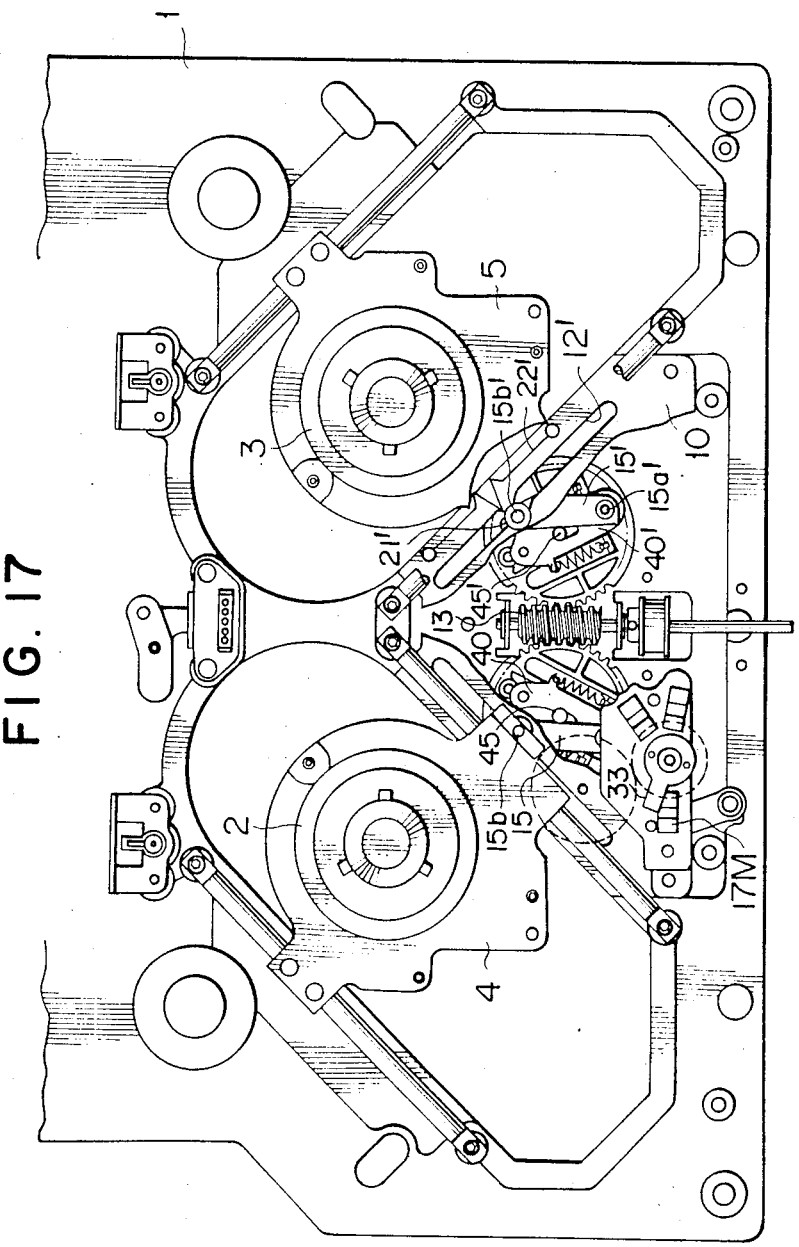

REEL SUPPORT POSITIONING DEVICE FOR A CASSETTE TAPE RECORDING AND/OR REPRODUCING APPARATUS ACCOMMODATING CASSETTES OF DIFFERENT SIZES

BACKGROUND OF THE INVENTION

The present invention relates to a structure of a mechanism of a magnetic recording/apparatus, for example, such as a video tape recorder (VTR), which can record or reproduce a signal on a tape-like recording medium wound on a pair of reels, and, more particularly, to a structure of a shifting device for shifting reel supports, on which a pair of reels having plural different sizes (i.e., having different reel diameters and/or different distances between the reels) or a tape cassette (referred to as merely "cassette" hereinafter) including reels therein can be mounted.

In the past, as examples of such structures of the shifting device, structures using cassettes, particularly, structures applicable to two kinds of cassettes having different sizes and structures applicable to three kinds of cassettes having different sizes have been proposed. Among them, in the structure applicable to two kinds of cassettes having different sizes, generally, reel support bases, on which reel supports are mounted, abut against supporting blocks for supporting guide members such as rails for guiding the reel support bases and are maintained in a predetermined position on the supporting blocks by means of bias springs.

On the other hand, as the structure applicable to three kinds of cassettes having different sizes, a structure is disclosed in the Japanese Patent Unexamined Publication No. 62-92154. According to this structure, in order to permit the use of three kinds of cassettes having different sizes, in addition to a driving source for shifting the reel support bases along the guides and a transmission mechanism for transmitting the driving force from the driving source to the reel support bases, it is necessary to provide a positioning mechanism for positioning and holding the reel support bases in a predetermined position after the reel support bases are shifted corresponding to the cassette having an intermediate size, and a driving force generating means for operating such positioning mechanism. To this end, in this conventional structure, a motor is used as the driving source for shifting the reel support bases and the driving force generating means for operating the positioning mechanism, and a belt-pulley arrangement or a gear train is used as the transmission mechanisms therefor. Further, the combination of pin, V-shaped notch and spring is used as the positioning mechanism. In many cases, the V-shaped notches are formed in the side surfaces of the reel support bases. When the V-shaped notch moved together with each reel support base reaches a predetermined position, the pin automatically enters into the V-shaped notch, thus positioning and holding each reel support base in the predetermined position. The spring is arranged between each reel support base and the base shifting mechanism to cause the V-shaped notch of the reel support base to abut against a fixed part including the pin by a spring force thereof, thereby positioning and holding the associated reel support base at that position. By providing a sensor, after each reel support base is shifted to the predetermined position, the motor is deenergized to hold the base stationary at that position. More particularly, the sensor detects the position of each reel support base during the movement thereof and emits a detection signal, by which a control circuit is activated to shut off the supply of electric power to the motor, thus stopping the motor.

As for means for changing over the driving force transmission mechanism corresponding to the sizes of three kinds of cassettes, the combination of a control member and a plunger is used.

One problem with the above-mentioned conventional technique resides in the fact that, since the driving force for shifting the reel support bases and the driving force for positioning and holding the bases are obtained by the single motor through the differential mechanism, it is necessary to provide the changing-over means (including the plunger and the like) for changing the driving force from the motor between two driving forces, i.e., the driving force for shifting the reel support bases and the driving force for positioning and holding the bases. Accordingly, the number of parts constituting the apparatus is increased and the apparatus itself is more complicated.

Yet another problem with the above-mentioned conventional technique resides in the fact that, since when the motor is deenergized, the reel support bases cannot be immediately stopped accordingly due to inertia thereof, actual positions where the reel support bases are stopped will deviate or differ from desired positions. And, such positional deviation in the case where each reel support base is shifted from a position for a larger cassette to a position for an intermediate cassette will occur in the opposite direction to that when each reel support base is shifted from a position for a smaller cassette to the position for an intermediate cassette. In order to assure the positioning and holding of the bases with high accuracy, it is necessary to limit such positional deviation to a predetermined value or less. To this end, in the conventional techniques, high accuracy detectors and complicated control means must be prepared.

The above-noted problems will similarly occur in an apparatus of a so-called open-reel type without using the cassettes, as well as in the apparatus using the cassettes.

SUMMARY OF THE INVENTION

An object of the present invention is to provide a reel support shifting device which can solve the above-noted problems and thus can positively shift and accurately position reel support bases corresponding to the size of the reel or the cassette including the reels therein, with a compact and simple mechanism.

In accordance with the present invention, a construction is provided including: a shifting structure including reel supports; guide members each having a straight portion, for guiding and supporting the shifting structure; a first guiding means comprising elongated guide slots extending in parallel with the guide members; and a second guiding means provided on the shifting structure including the reel supports. Elongated elongated slots each extend in a direction at a certain angle with respect to a longitudinal direction of the first guiding means, operation members are provided comprising levers each having an end engaged by the first and second guiding means. Rotary members are provided for respectively rotating the other end of the corresponding operation member pivoted on a respective rotatable pivot shaft, together with the pivot shaft, at a predetermined radial position spaced from a center of rotation thereof, with pivot shaft supporting members being rotatable together with the rotary members and respectively arranged in a radial direction of the corresponding rotary member and having one end connected to the other end of the corresponding operation member at the rotatable pivot shaft and the other end connected to the corresponding rotary member at a predetermined radial position of the rotary member. Elastic members such as, for example, springs, each have one end connected to the corresponding rotary member and acting an elastic force on the corresponding pivot shaft, to which the operation member is connected in a direction radially outwardly of the rotary member, and motors generating a driving force to rotate the respective rotary members.

In accordance with further advantageous features of the present invention, a shift regulating means is provided on an end portion or an intermediate portion of each operation member (lever), for shifting the one end of the operation member (lever) connected to the first and second guiding means accurately and smoothly along a predetermined path in the first and second guiding means.

By virtue of the above noted features of the present invention, the shifting structure is integrally connected to the reel supports, and can be shifted to a predetermined position corresponding to the diameter of the reels, the distance between the reels and/or the size of the cassette including the reels and be positioned and held in that position.

Moreover, the above noted features of the present invention enable the first guiding means to guide the end of each operation member (lever) engaged by the first guiding means along a predetermined path to a position corresponding to the diameter of the reels, the distance between the reels and/or the size of the cassette including the reels.

The second guiding means in accordance with the present invention is formed on the shifting structure including the reel supports, and guides the end of each operation member engaged by the second guiding means in a direction oriented at a predetermined angle (such as a right angle) with respect to the guiding direction of the first guiding means and at the same time shift the first guiding means in response to the movement of said end of each operation member.

Each of the operation members of the present invention constructed as, for example, levers, converts the rotational movement of the corresponding rotary member into a movement including at least a straight movement along the first guiding means, at the distal end thereof.

In accordance with the present invention, each rotary member is provided, at a radial position thereof spaced apart from the center of rotation thereof, with the pivot shaft by which the other end of the corresponding operation member is rotatably supported, and is reciprocably rotated by the rotational driving force from the motor to reciprocably rotate the other end of the operation member around the center of the rotation thereof.

Furthermore, each pivot shaft supporting member according to the present invention, rotated together with the corresponding rotary member, thereby swinging the pivot shaft to which the corresponding operation member is connected around the center of rotation of the rotary member, thus causing the end of the operation member engaged by the first and second guiding means to move along a predetermined straight path.

Each elastic member fashion, for example, as a spring, applies a tension force to the end of the corresponding operation member through the respective pivot shaft on the pivot shaft supporting member, whereby the end of the operation member engaged by the first guiding means positively abuts against a guiding surface of the first guiding means. Particularly, in the position corresponding to the diameter of the reels, the distance between the reels and/or the size of the cassette including the reels, each elastic member applies the tension force to the corresponding operation member as a positioning force.

Where a positioning and holding mechanism including a V-shaped notch and the like is provided in the first guiding means, according to the present invention, the shift regulating means applies a regulating force to the intermediate portion or the end portion of the corresponding operation member so that the end of the operation member engaged and guided by the first and second guiding means is positively urged against the guiding surface of the first or second guiding means while being situated in the positioning and holding mechanism including the V-shaped notch.

BRIEF DESCRIPTION OF THE DRAWINGS

FIG. 17 is a plan view showing a structure in the case where springs are used as an further embodiment of the shift regulating means.

DETAILED DESCRIPTION OF THE PREFERRED EMBODIMENTS

Figure 1:
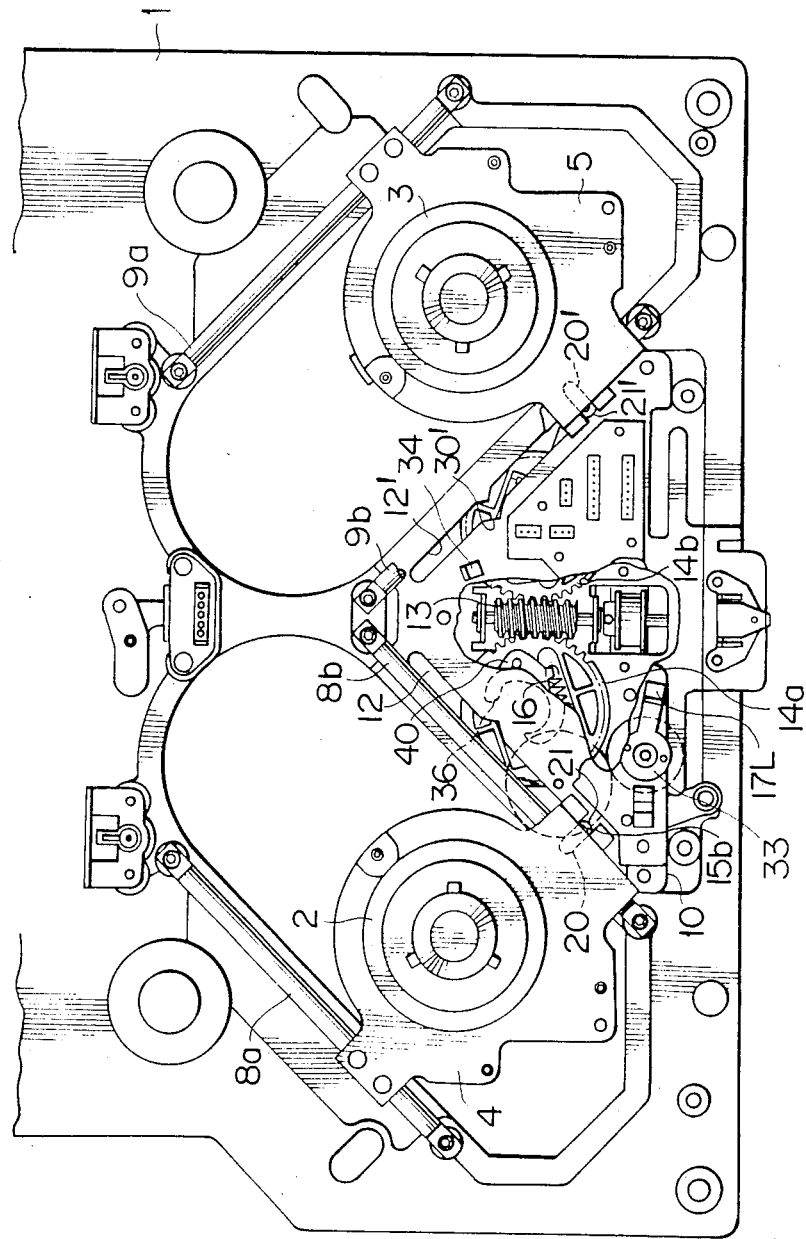
FIG. 1 is a plan view of a reel support shifting device according to a preferred embodiment of the present invention, showing a condition, in which reel supports are positioned in a position corresponding to L-sized cassette.
Figure 2:
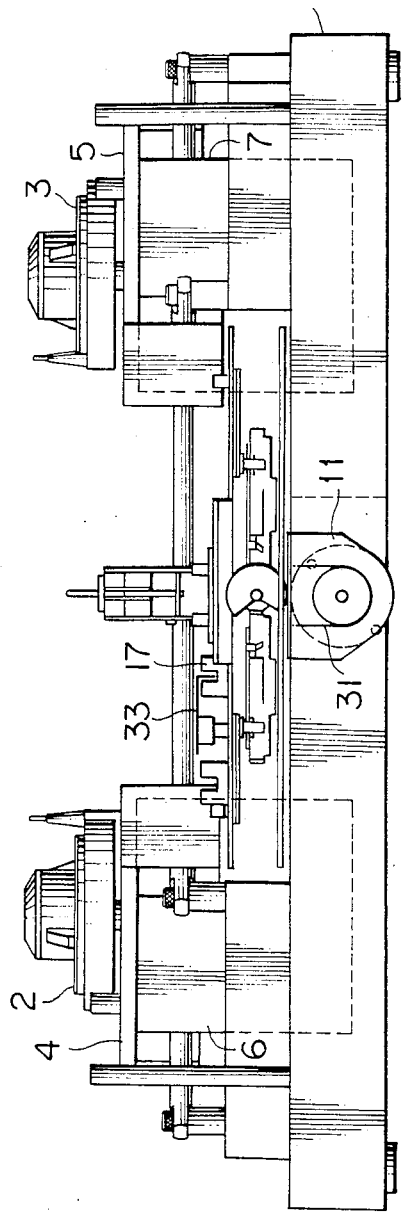
FIG. 2 is a side elevational view of the device of FIG. 1.

Referring now to the drawings wherein like reference numerals are used throughout the various views to designate like parts and, more particularly, to FIGS. 1 and 2, according to these figures, a video cassette recorder (VCR) for accommodating L, M and S-sized cassettes, each including a pair of reels, comprises reel support bases 4, 5 constituting a shifting structure and reel supports 2, 3 connected to reel motors 6 and 7. By rotating such reel motors 6, 7, reels provided in the cassette mounted and engaged by the reel supports 2, 3 are driven to wind and unwind the tape. The reel support bases 4, 5 are slidably mounted on respective guides (guide members) 8a, 8b and 9a, 9b arranged in parallel with the corresponding reel support bases. The guides 8a, 8b and the guides 9a, 9b are arranged along oblique sides of an isosceles triangle, respectively. Guide slots 12 and 12', serving first guide means, are formed in a sub-base plate 10 arranged on a base plate 1 to be in parallel with the longitudinal directions of the guides 8a, 8b and 9a, 9b, respectively. V-shaped notches 30, 30' are formed in the guide slots 12, 12', respectively, these notches serving as a positioning and holding mechanism for positioning and holding the reel support bases in a position corresponding to a distance between reels in the cassette having the M size. Guide pins 15b, 15b' and rollers 21, 21' are adapted to move in the corresponding guide slots 12, 12'. The rollers 21, 21' are coaxially fitted on the corresponding guide pins 15b, 15b'. Edge portions of the guide slots 12, 12' are sandwiched between the guide pins 15b, 15b' and the rollers 21, 21'.

Cams 36 and 36' acting as a shift regulating means are fixed to a back surface of the sub-base plate 10. Further, a worm gear 13 is provided on the base plate 1 on a centerline between the two reel supports 2, 3. The worm gear 13 is connected to a motor 11 arranged below the worm gear through a belt 31.

Two worm wheels 14a and 14b are symmetrically arranged on both sides of the worm gear 13 to mesh with the worm gear and constitute rotary members. Pivot shafts 15a, 15a' are arranged on the corresponding worm wheels 14a, 14b at predetermined radial positions thereof, and each of levers 15, 15', acting as operation members, is rotatably supported, at its one end, by the corresponding pivot shaft. The pivot shafts 15a, 15a' are connected to the worm wheels 14a, 14b, respectively, by springs 16, 16' through pivot shaft supporting members 40, 40', respectively, so that the pivot shafts 15a, 15a' are rotated in opposite directions about the centers of the worm wheels 14a, 14b in response to the rotation of the worm wheels. The pivot shaft supporting members 40 and 40' have slots 60, 60' engaged by center shafts 45, 45' of the worm wheels 14a, 14b. Accordingly, the springs 16, 16' apply tension forces to the respective pivot shafts 15a, 15a' only when longitudinal ends of the slots 60, 60' are in positions, in which the corresponding center shafts 45, 45' of the worm wheels 14a, 14b do not abut against them. When the pivot shafts 15a, 15a' are subject to the tension forces, they are urged radially outwardly of the worm wheels 14a, 14b by the action of the springs 16, 16'. These positions correspond to predetermined positions where the levers 15, 15' are stopped after they are shifted in correspondence to each of the cassette sizes L, M and S. Guide pins 15b and 15b' are provided on the other ends of the levers 15 and 15', respectively. The guide pins 15b, 15b' are received in the guide slots 12, 12' of the sub-base plate 10, as well as the rollers 21, 21', as mentioned above, and can be shifted along such guide slots. Further, on substantially central portions of the levers 15, 15', cam pins 35, 35' are fixedly mounted, which cam pins act as regulated members of the shift regulating means. The positions of the cam pins 35, 35' on the corresponding levers 15, 15' are so selected that both sides of the cam pins are encased by the corresponding regulating cams 36, 36' which are engaged by the cam pins. With this arrangement, the respective cams 36, 36' positively abut against the cam pins 35, 35' at predetermined timing and positions. Recesses or slots (second guiding means) 20, 20' are formed in the reel support bases 4 and 5, respectively. The slots 20, 20' extend in directions, in which the respective reel supports 2 and 3 are shifted, i.e., in directions perpendicular to the guide slots 12, 12', respectively. Distal ends of the guide pins 15b, 15b' are received in the slots 20, 20', respectively. The reel support bases 4, 5 are moved on the guides 8a, 8b, 9a, 9b by the movements of the guide pins 15b, 15b'. Sensors 17L, 17M and 17S are provided on the sub-base plate 10 in positions corresponding to an L position, M position and S position on the reel support bases 4 and 5, respectively. The L position is a stop position of the reel support bases 4, 5 corresponding to the cassette of L size, and, similarly, the M position and S position are stop positions corresponding to the cassettes of M size and S size, respectively. The sensors 17L, 17M, 17S are provided for detecting the L, M, S positions, respectively.

A gear is provided below the worm wheel 14a. By rotating the worm gear 14a, an arrow 33 is rotated through an idle gear 32. The sensors 17L, 17M and 17S are constituted by photo-interrupters. When an optical path of the detection system is interrupted or blocked by the rotation of the arrow 33, the rotated positions of the worm wheels 14a and 14b are detected. Consequently, the positions of the reel supports 2 and 3 can be detected. Two stoppers 34 are provided for each of the levers (operation members) 15, 15' to prevent excessive amounts of turning of the levers. The stoppers 34 are arranged outwardly of the L and S positions of each of the levers 15, 15'. Due to the provision of such stoppers, even if the motor 11 is not stopped due to possible failure thereof for any reason, the levers 15, 15' can not be shifted beyond the respective stoppers and are stopped by the respective stoppers. When movements of the levers 15, 15' are stopped by the corresponding stoppers 34, the motor 11 is locked such that over-current flows in a motor coil. By detecting such over-current, the control circuit is activated in response to a detection signal to shut off the current to the motor 11.

Figure 9:
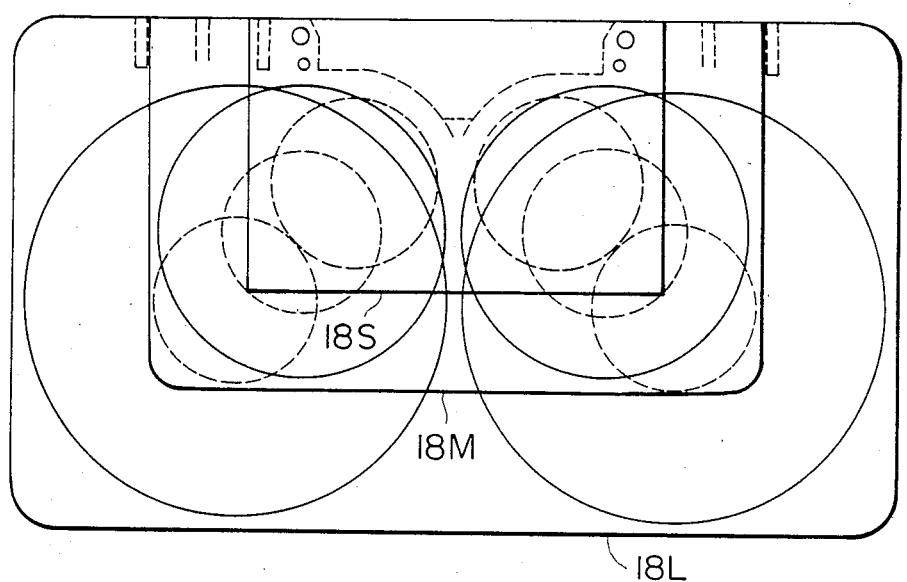
FIG. 9 is a plan view showing the L, M and S-sized cassettes.

FIG. 9 shows cassettes 18S, 18M and 18L. When the reel supports 2, 3 are positioned corresponding to distances between the reels in the cassette 18L of L size, cassette 18M of M size or cassette 18S of S size, the L, M or S size cassette can be utilized.

FIG. 1 shows a condition, in which the device according to the present invention changes thereon the largest cassette 18L. Now, the operation of the reel support bases 4, 5 will be described in case it is desired to mount the cassette 18M of the smaller M size (medium size) to the apparatus after the largest cassette 18L is dismounted from the device in the condition shown in FIG. 1.

Figure 3:
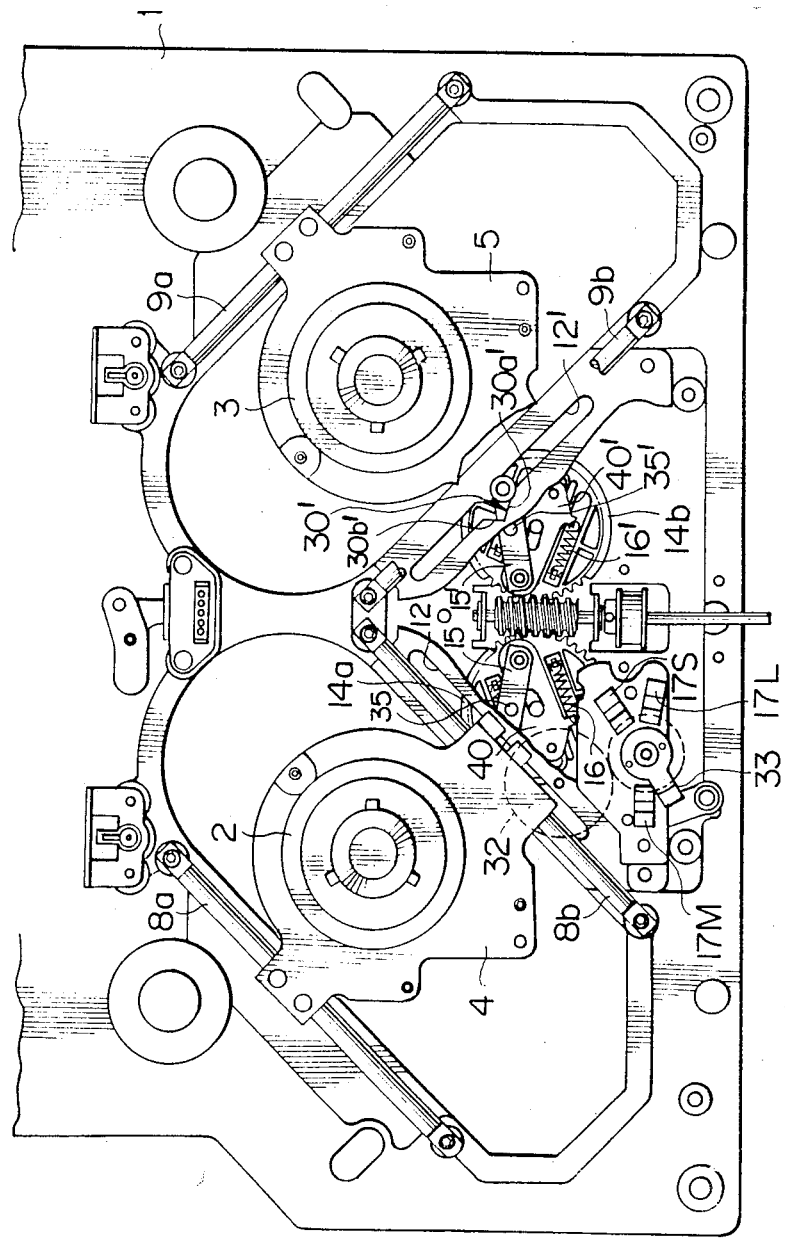
FIGS. 3 and 4 are plan view showing conditions just before the reel supports are positioned in a position corresponding to an M-sized cassette.
Figure 4:
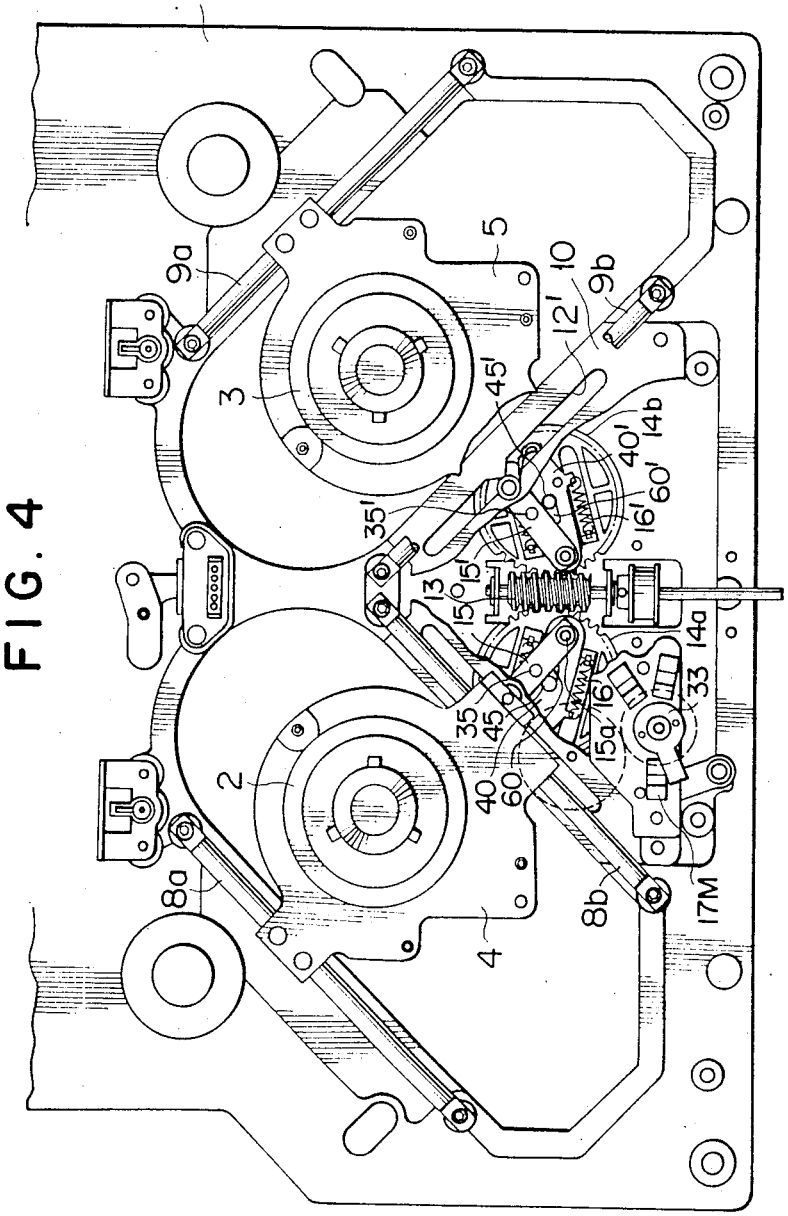
Figure 10:
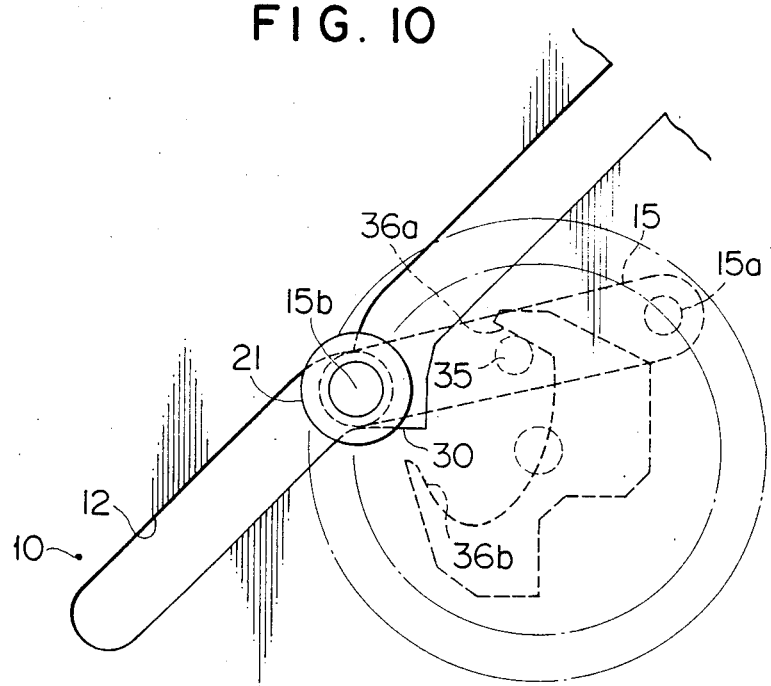
FIG. 10 is an enlarged plan view showing a cam and a cam pin as a shift regulating means.

When the cassette 18M of the M size is inserted into a cassette inlet, the fact that the inserted cassette is the M size cassette is detected by a cassette size detector (not shown) provided in the cassette inlet. By a signal from the cassette size detector, a system control circuit (not shown) is activated to supply an electric current to the motor 11. When the motor 11 is energized, the reel support bases 4 and 5 are shifted to the positions corresponding to the cassette of M size. In this case, the rotational driving force of the motor 11 is transmitted to the worm gear 13 through the belt. The worm wheels 14a and 14b are arranged on both sides of the worm gear 13 to rotate therewith. The movements of the two worm wheels 14a, 14b and the reel support bases 4, 5 are effected symmetrically with respect to each other. The reel support base (unwinding side) 4 is driven by the left worm wheel 14a, and the right reel support base (winding or taking-up side) 5 is driven by the right worm wheel 14b. When the reel support bases 4, 5 are shifted from positions corresponding to a larger cassette to positions corresponding to a smaller cassette, the left worm wheel 14a is rotated in a clockwise direction while the right worm wheel 14b is rotated in an counterclockwise direction. Thus, in FIG. 1, the left worm wheel 14a is rotatingly driven in a clockwise direction. The lever 15 engaged by the worm wheel 14a is shifted while one end (guide pin) 15b of the lever is guided in the guide slot 12. Consequently, the reel support base 4 is also shifted in response to the movement of the guide pin 15b. The right worm wheel 14b, the associated lever 15' and guide pin 15b' on the tip end thereof are similarly driven, so that the right reel support base 5 is moved in the predetermined direction. The left worm wheel 14a, lever 15 and guide pin 15b are moved in synchronism with the right worm wheel 14b, lever 15' and guide pin 15b'. FIG. 3 shows a condition just before the two reel support bases 4, 5 are shifted to be positioned in a position corresponding to the cassette of M size through the rotation of the corresponding worm wheels 14a, 14b. From this condition, when the worm wheels 14a, 14b are further rotated, the cam pins 35, 35' on the respective levers 15, 15' are controlled or regulated by cam surfaces 36a, 36b and 35a', 36b' of the cams 36 and 36', respectively. Consequently, the guide pins 15b, 15b' on the ends of the levers 15, 15' and the associated rollers 21, 22 are guided into end surfaces 30a, 30a' of the V-shaped notches 30, 30' which serve as a stopping and positioning construction for the cassette of M size and are formed in the guide slots 12, 12', respectively. Therefore, the guide pins and rollers are guided in the central portions of the V-shaped notches 30, 30', respectively, as shown in FIG. 4. The engagement between the cam 36 and the cam pin 35 in this condition is shown in FIG. 10.

Figure 5:
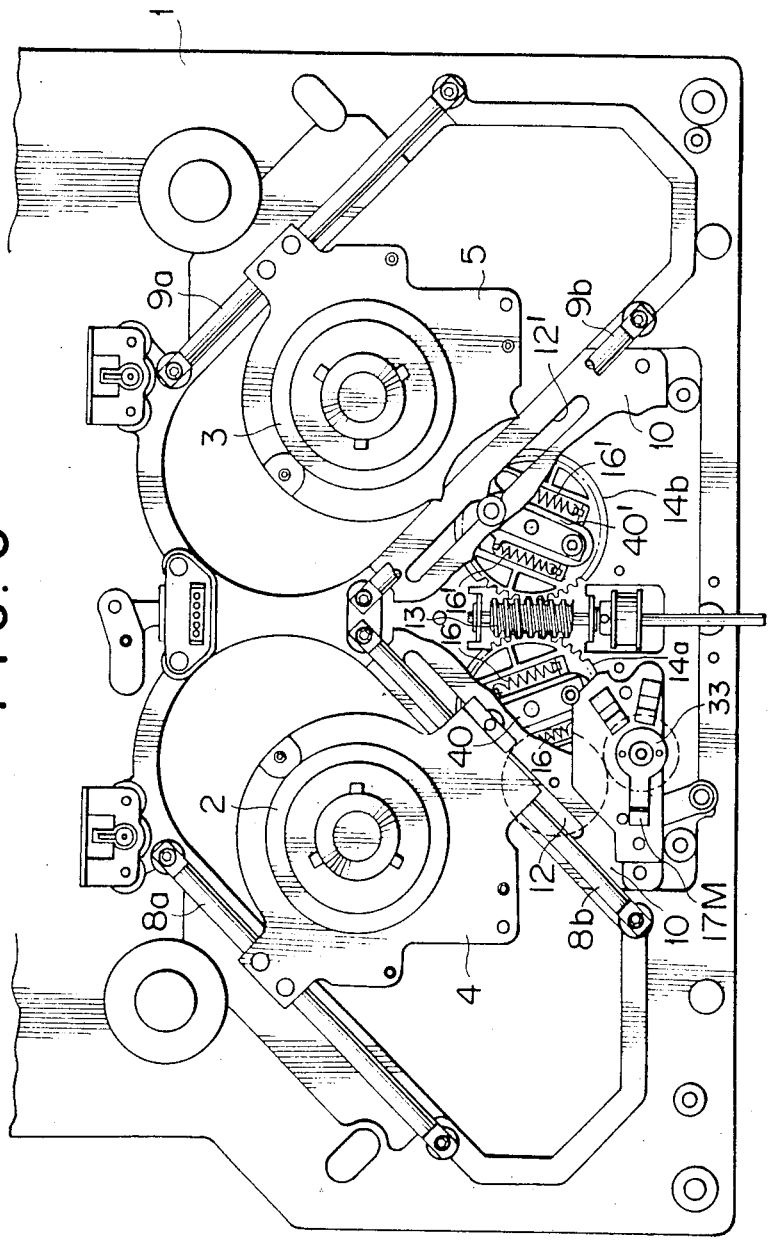
FIG. 5 is a plan view showing a condition, in which the reel supports are positioned in the position corresponding to the M-sized cassette.

When the worm wheels 14a and 14b are further rotated in the respective directions, the pivot shafts 15a, 15a' of the levers 15, 15' are moved toward the central shafts 45, 45' of rotation of the respective worm wheels 14a, 14b against the biasing forces of the springs 16, 16' provided on the worm wheels 14a, 14b, respectively. That is to say, the pivot shaft supporting members 40, 40' are shifted toward the central shafts 45, 45' together with the pivot shafts 15a, 15a'. Consequently, the longitudinal ends of the elongated slots 60, 60' are spaced away from the central shafts 45, 45' of rotation of the worm wheels 14a, 14b to position the same in intermediate portions of the elongated slots 60, 60', respectively. In this condition, the springs 16, 16' act on the guide pins 15b, 15b' and rollers 21, 21' through the pivot shaft supporting members 40, 40', pivot shafts 15a, 15a' and levers 15, 15' to urge these elements 15b, 15b', 21, 21' against the V-shaped notches 30, 30', thus positively positioning them in the notches. With the arrangement according to this embodiment, when the levers 15, 15' are shifted in the center positions of the worm wheels 14a, 14b, the position corresponding to the cassette of M size is achieved or established. In this position, the above-mentioned positioning is effected. When the levers 15, 15' are shifted to the positions where such positioning is to be effected, the rotational force of the worm wheel 14a is transmitted to the gear fixed to a rotating shaft of the arrow 33 through the idler gear 32. Consequently, the arrow 33 is rotated to shut off the optical path of the sensor 17M, thus detecting the fact that the reel supports 2, 3 have been shifted to positions corresponding to the cassette 18M of M size. By the detection signal from the sensor 17M, the control circuit is activated to stop the supply of electric current to the motor 11. With the operation mentioned above, the reel supports 2 and 3 are positioned and held in positions corresponding to the cassette 18M of M size, as shown in FIG. 5.

Next, an operation of the mechanisms of the device when it is desired to use the cassette 18S of S size in place of the cassette 18M of M size in the condition that the reel supports are positioned for the cassette 18M of M size (condition shown in FIG. 5) will be described.

Figure 6:
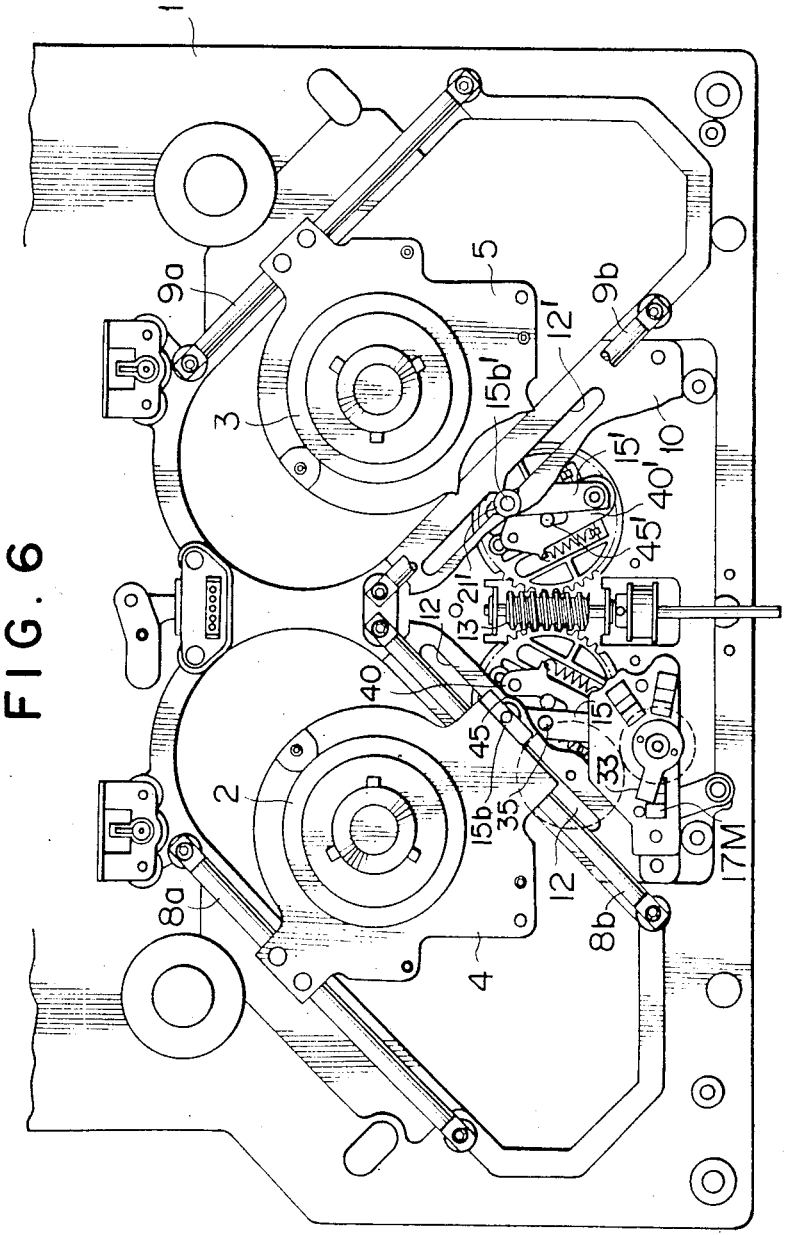
FIGS. 6 and 7 are plan views showing conditions just before the reel supports are shifted from the position corresponding to the M-sized cassette having the M size to a position corresponding to a S-sized cassette.

Also in this case, similar to the above-mentioned case, first of all, the size of a cassette to be used is detected at the cassette inlet. Then, by the detection signal, the motor 11 starts to rotate. Rotation of the motor 11 causes the worm wheels 14a and 14b to be rotated in clockwise and counterclockwise directions, respectively. In this case, the pivot shafts 15a, 15a' of the levers 15, 15' are turned about other pivots (i.e., guide pins 15b, 15b') on the levers, with the result that the reel support bases 4 and 5 are not shifted. Such condition is shown in FIG. 6. In this condition, the arrow 33 has been rotated to open the optical path of the sensor 17M.

Figure 7:
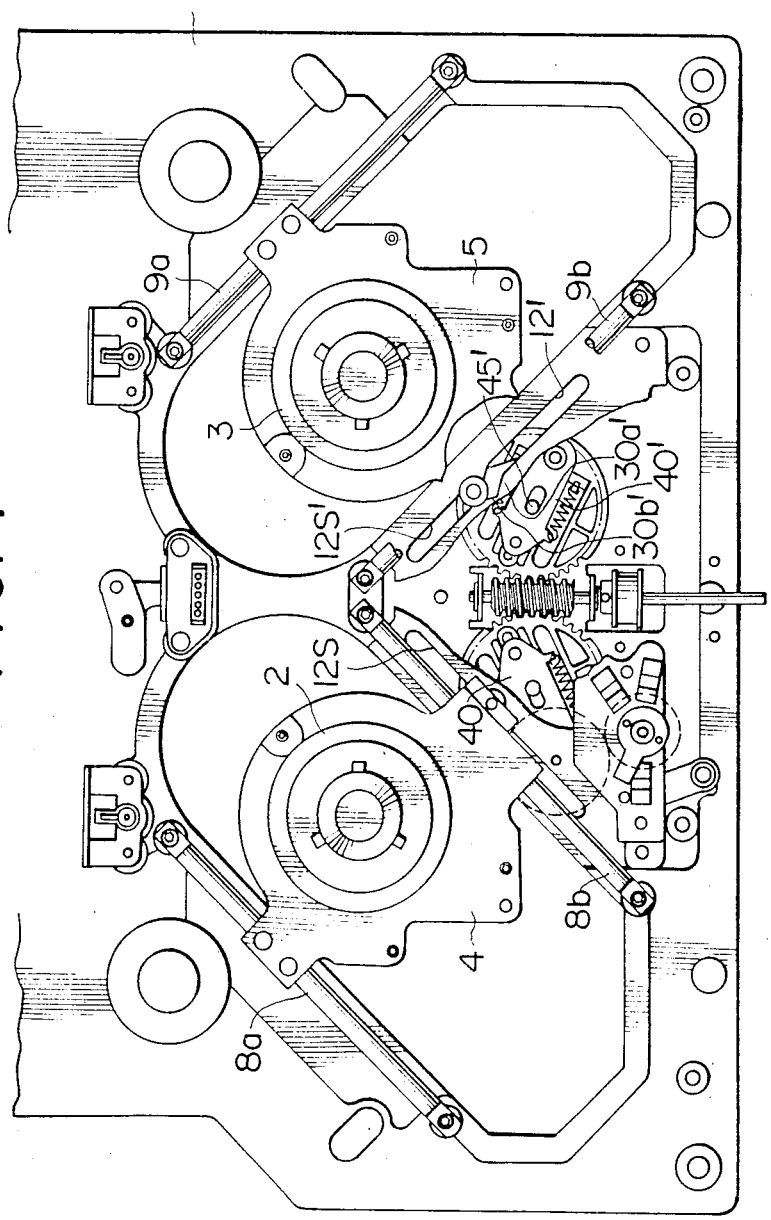

When the worm wheels 14a, 14b are further rotated, the cam pins 35, 35' formed on the respective levers 15, 15' are regulated by the cam surfaces 36a, 36b and 36a', 36b' of the cams 36, 36', respectively. Thus, the guide pins 15b, 15b' on the ends of the levers 15, 15', and the associated rollers 21, 21' are pushed out along the end surfaces 30b, 30b' of the V-shaped notches 30, 30' of the guide slots 12, 12' formed in the sub-base plate 10. Consequently, the movable elements are shifted to a position shown in FIG. 7.

Figure 8:
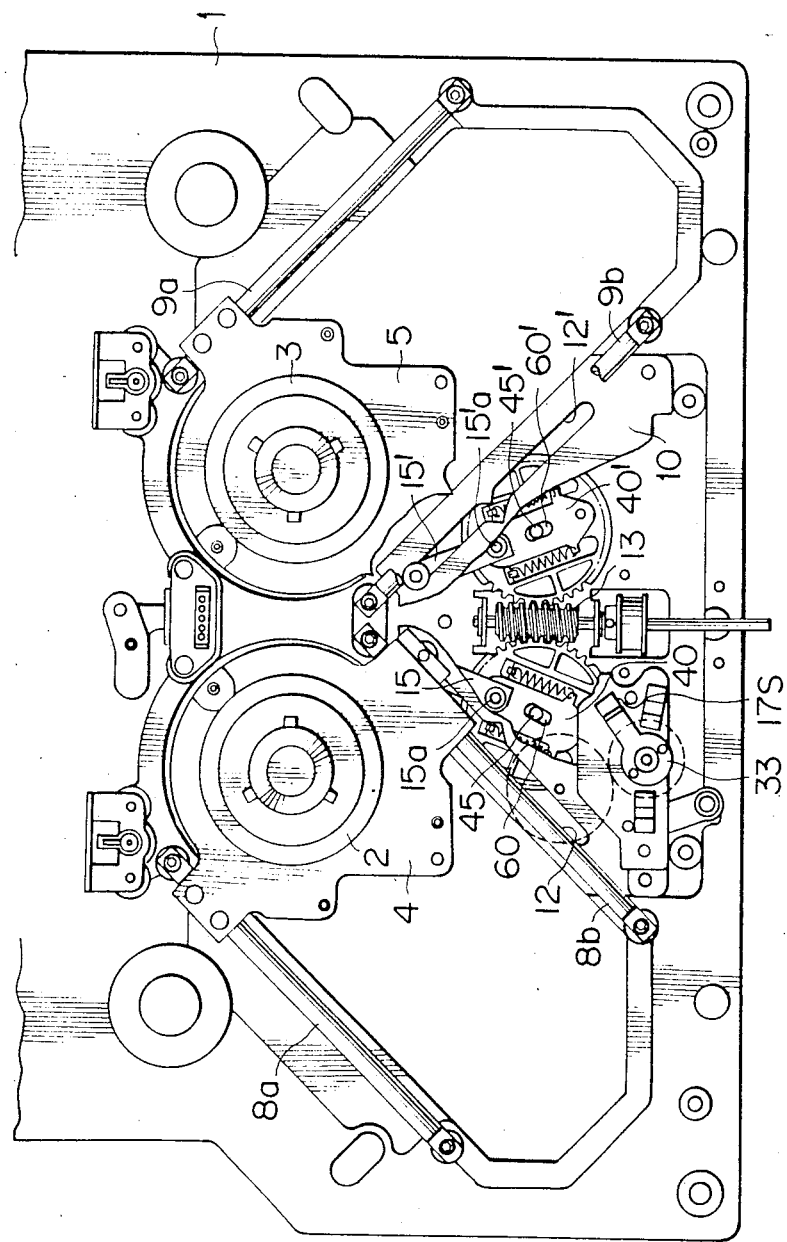
FIG. 8 is a plan view showing a condition, in which the reel supports are positioned in the position corresponding to the S-sized cassette.

When the worm wheels 14a and 14b are further rotated, the levers 15, 15' move the guide pins 15b, 15b' engaged by the guide slots 12, 12', thus pushing the reel support bases 4, 5 toward a position corresponding to the cassette of S size (S position) along the respective guide slots 12, 12'. When the worm wheels 14a, 14b are further rotated, stopper portions (terminal edges of the guide slots 12, 12') 12S, 12S' in the guide slots 12, 12' abut against the rollers 21, 21' provided around the guide pins 15b, 15b' on the tip ends of the levers 15, 15' to cause the same to reach a position corresponding to the cassette of S size. When the worm wheels 14a, 14b are further rotated, the pivot shafts 15a, 15a' of the levers 15, 15' are shifted toward the center positions of the worm wheels 14a, 14b against the tension forces of the springs 16, 16'. And, at last, the levers pass through lines connecting the pivot shafts 15a, 15a' and the centers of rotation of the worm wheels 14a, 14b to reach the opposite sides. The positions of the levers 15, 15' in such condition are detected by the sensor 17S, thus shutting off the supply of electric current to the motor 11 to stop the motor. This condition is shown in FIG. 8.

Incidentally, when the reel supports 2, 3 are shifted in the reverse directions, i.e., from the position corresponding to the cassette of S size to the position corresponding to the cassette of M size, or from the position corresponding to the cassette of M size to the position corresponding to the cassette of L size, the operation for shifting the reel supports are performed in a manner contrary to the above case (where the reel supports are shifted from the L position to the M position or from the M position to the S position).

Figure 11:
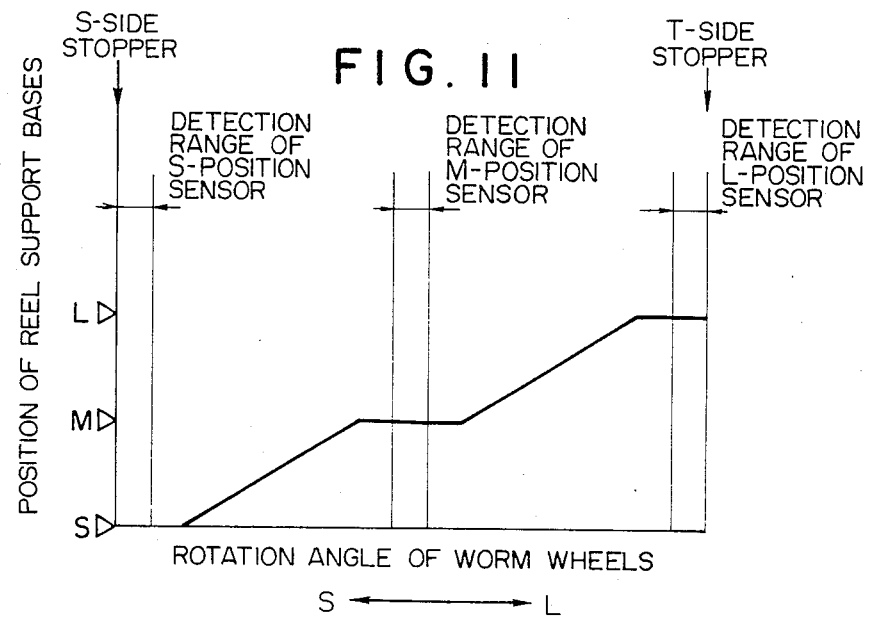
FIG. 11 is a graph showing a relation between a rotation angle of each of worm wheels as rotary members and a position of each reel support.

FIG. 11 shows a relation between the rotation angle of each of the worm wheels 14a, 14b and the shifted position of each of the reel support bases 4, 5 and the detection ranges of the position sensors 17S, 17M, 17L for the reel support bases 4, 5. During the continuous rotation of the worm wheels 14a, 14b each reel support base 4, 5 performs intermittent and linear actions of movement and stop. The sensors 17S, 17M and 17L detect movements of the reel supports to the respective positions on the basis of the fact that the arrow 33 interlocked with the worm wheels 14a, 14b shuts off or passes irradiation of light to the sensors.

Figure 12:
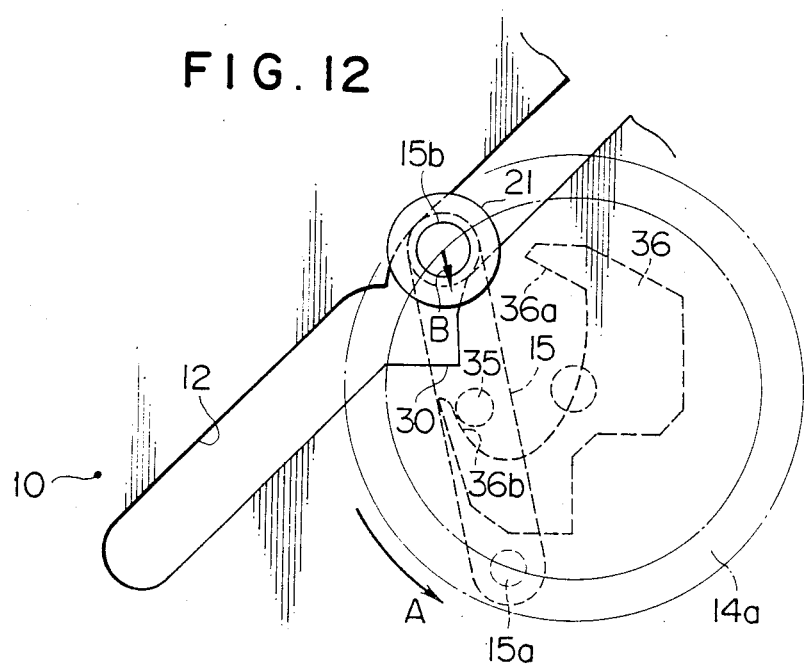
FIG. 12 is a plan view showing a condition just before a distal end of a lever is positioned from the position corresponding to the S-sized cassette to the position corresponding to the M-sized cassette by rotating the corresponding rotary member in an anti-clockwise direction.

FIG. 12 shows a condition just before the guide pin 15b and roller 21 are moved into the V-shaped notch 30 by the counterclockwise rotation of the worm wheel 14a. In this condition, the guide pin 15b and roller 21 are pulled in a direction B by the lever 15 connected to the worm wheel 14a to be moved into the V-shaped notch 30. In a similar manner, the guide pin 15b' and roller 21' are moved into the V-shaped notch 30' through the movement of the worm wheel 14b.

Figure 13:
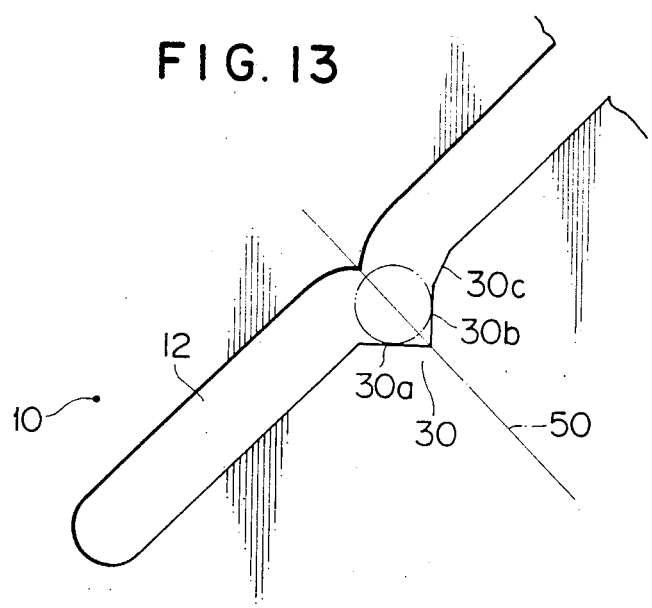
FIG. 13 shows a detailed construction of a V-shaped notch.

FIG. 13 shows an example of the V-shaped notch 30 in detail. In this example, the V-shaped notch 30 has straight inclined surfaces. However, the straight inclined surfaces are asymmetrical with respect to a line 50 perpendicular to the guide slot 12. That is to say, the inclined surface on the side corresponding to the cassette of S size comprises two differently inclined surfaces 30b and 30c. The inclined surface 30c adjacent to a flat portion of the guide slot 12 is inclined at a smaller angle than that of the inclined surface 30b forming the tip end of the V-shaped notch. The V-shaped notch 30' provided on the other guide slot 12' is shaped in a similar manner to the V-shaped notch 30. With this arrangement, in the condition shown in FIG. 12, the guide pins 15b, 15b' and rollers 21, 21' can be quickly and smoothly shifted and guided in predetermined directions. Therefore, the load imposed on the motor when the worm wheels are driven can be considerably reduced. Incidentally, the inclined surface 30c having a smaller inclined surface may be provided on the side corresponding to the cassette of L size.

Further, each of the V-shaped notches 30, 30' may comprise curvilinear inclined surfaces or the combination of straight and curvilinear inclined surfaces, in place of the illustrated straight inclined surfaces. Furthermore, the tip of each V-shaped notches 30, 30' may be rounded or flattened.

The positioning of the reel supports 2, 3 depending on the cassette sizes is effected by the use of the tension forces of the springs 16, 16' provided in the respective worm wheels 14a, 14b. In order that the guide pins 15b, 15b' and rollers 21, 21' are positively positioned in the respective V-shaped notches 30, 30', adequate tension forces are required. On the other hand, in order that the guide pins 15b, 15b' and rollers 21, 21' are smoothly introduced into the V-shaped notches 30, 30' or smoothly get away from such V-shaped notches, a force for offsetting or overcoming the tension forces of the springs 16, 16' is required. The rotational forces of the worm wheels 14a, 14b acting on the pivot shafts 15a, 15a' are amplified severalfold by toggle action to be applied to the respective levers 15, 15' and pivot shaft supporting members 40, 40'. Accordingly, though a torque, by which the worm wheels 14a and 14b are rotated is small, adequately large forces can act on the guide pins 15b, 15b' on the ends of the levers 15, 15' by such torque acting on the pivot shafts 15a, 15a'. These large forces serve to offset or overcome the tension forces of the springs 16, 16'. Consequently, the guide pins 15b, 15b' and rollers 21, 21' are smoothly introduced in the respective V-shaped notches or smoothly get away from the respective V-shaped notches. Further, the slots 20, 20', perpendicular to the guide slots 12, 12' formed in the reel support bases 4, 5, are formed in separate members from the reel support bases 4, 5, respectively. The provision of these separate members facilitates assembly and disassembly of these elements. Accordingly, maintenance, inspection and/or replacement of parts of the device can be simplified, thus reducing the manufacturing and/or maintenance cost of the device.

As mentioned above, in the illustrated embodiment, while the substantially rectangular slots 20, 20', perpendicular to the directions of movements of the reel supports 2, 3, are provided as the second guiding means, any blind notches, i.e., substantially rectangular slots may be adopted as the second guiding means.

Further, while the guides 8a, 8b, 9a, 9b as the guide members, the guide slots 12, 12' as the first and second guiding means, the V-shaped notches 30, 30', the levers 15, 15', the worm wheels 14a, 14b as the rotary members and the like are each provided as a pair, and the two reel supports 2, 3 are simultaneously shifted in the illustrated embodiment such a construction, in which only each one of these elements is provided in the device or a set (three or more) of these elements are provided in the device so that only one of the reel supports is shifted may be adopted.

Further, in the illustrated embodiment, the guide slots 12, 12' as the first guiding means, the slots 20, 20' as the second guiding means, the levers 15, 15', the worm wheels 14a, 14b as the rotary members, the springs 16, 16' and the like are disposed within the range of the distance between the centers of the reel supports 2 and 3 and are confined in a triangle defined by the reel supports and the guides 8b, 9b as the guide members. With this arrangement, the vacant space in the device can be effectively utilized, thus reducing the over-all size of the device.

Figure 16:
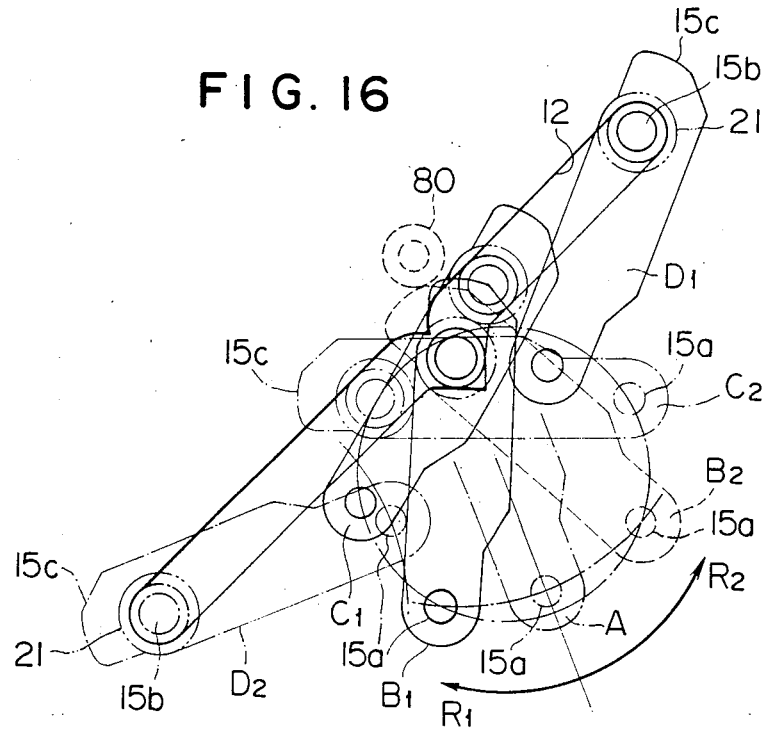
FIG. 16 is a plan view showing the posture of the lever of FIG. 14 during the movement thereof.
Figure 14:
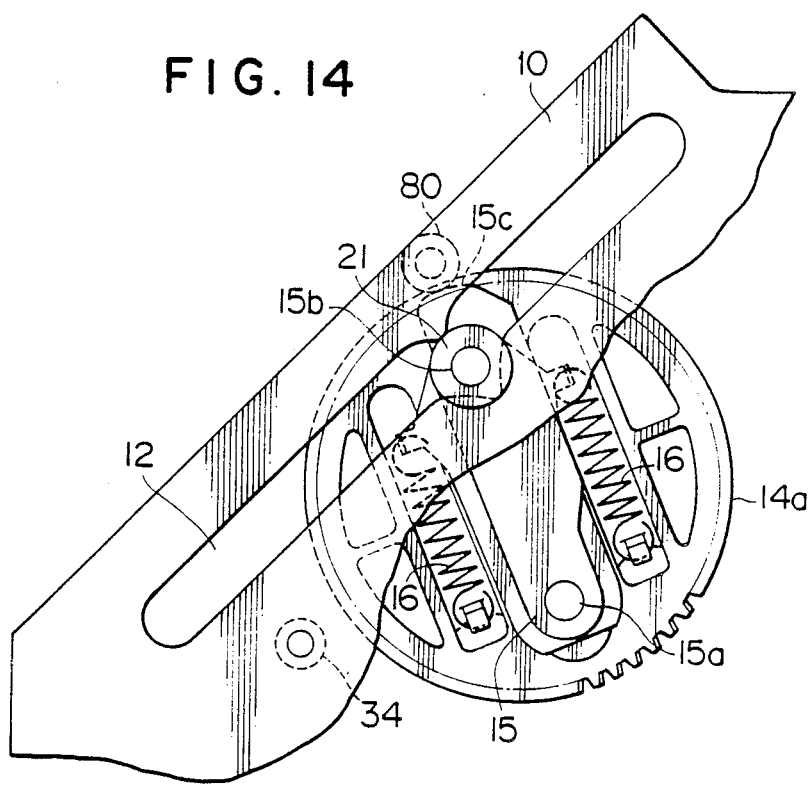
FIG. 14 is a plan view showing a condition, in which the lever is regulated by a cam provided on a distal end of the lever as another embodiment of the shift regulating means.
Figure 15:
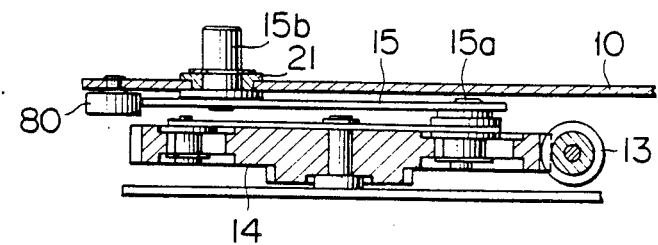
FIG. 15 is a sectional view of the structure shown in FIG. 14.

In addition, in the illustrated embodiment, while the posture of the levers 15, 15' is regulated by the cam construction fixedly mounted on the sub-base plate 10, such cam construction may be provided on the levers 15, 15'. This cam construction is shown in FIGS. 14 to 16. In FIG. 14, the structure of the lever 15 engaged by the guide slot 12 is shown in an enlarged scale, FIG. 15 shows the section thereof, and FIG. 16 shows the movements of the distal end of the lever 15 and the associated pivot portion. In this construction, the cam structure 15c is arranged on the lever 15 at the end thereof near the guide slot 12. A roller 80 is rotatably mounted on a fixed pin provided on the back side of the sub-base plate 10, in front of the cam structure 15c. When the guide pin 15b on the end of the lever 15 and the associated roller 21 are positioned in the V-shaped notch 30 of the guide slot 12, the cam structure 15c formed on the end of the lever 15 abuts against the roller 80, thus regulating the posture of the lever 15 so that the roller 21 is urged against the surface of the V-shaped notch. To this end, a cam surface of the cam structure 15c is provided at its central portion with an arcuate profile which is coaxial with with the guide pin 15b. With this arrangement, in the condition that the guide pin 15b and the roller 21 are held in the V-shaped notch 30, even when the pivot shaft 15a on the other end of the lever 15 is rotated, the cam surface of the cam structure 15c always abuts against the roller 80, thereby regulating the position of the end of the lever 15. In the cam surface of the cam structure 15c, both side portions of the circular profile are so shaped that, when the guide pin 15b and the roller 21 are being moved along the edge surface of the V-shaped notch 30, the cam structure always abuts against the roller 80 without separating therefrom, thus regulating the end position of the lever 15 correctly. A cam structure 15c' similar to the cam structure 15c is formed on the end of the lever 15', and a roller 80' is provided in front of the cam structure 15c'. The cam structure 15c' and the roller 80' function in the same manner as the cam structure 15c and the roller 80. In this arrangement, the movement of the lever 15 when the reel supports 2, 3 are shifted from the position corresponding to the cassette of M size to the position corresponding to the cassette of S size and when the reel supports are shifted from the position corresponding to the cassette of M size to the position corresponding to the cassette of L size is shown in FIG. 16. In FIG. 16, for example, when the reel supports are shifted toward the position corresponding to the cassette of S size, the lever is moved as follows. That is to say, when the pivot shaft 15a is turned about the center of the worm wheel 14a, the guide pin 15b and the roller 21 are pushed out of the V-shaped notch 30. Meanwhile, the cam structure 15c abuts against the roller 80, whereby the position thereof is regulated. Consequently, the guide pin 15b on the end of the lever 15 and the associated roller 21 are pushed out along the edge surface of the V-shaped notch 30, thus shifting the reel support base 4 toward the position corresponding to the cassette of S size along the guides 8a and 8b. Similarly, the lever 15' is moved by the worm wheel 14b, thus shifting the reel support base 5. The movement of the lever when the reel supports are shifted toward the position corresponding to the cassette of L size is essentially the same as that mentioned above, and, thus, the explanation thereof will be omitted. In FIG. 16, the reference character A designates the position of the lever 15 at the position corresponding to the cassette of M size, B1 and C1 designate the positions of the lever 15 when it approaches the position corresponding to the cassette of S size, D1 designates the position of the lever 15 at the position corresponding to the cassette of S size, B2 and C2 designate the positions of the lever 15 when it approaches the position corresponding to the cassette of L size, and D2 designates the position of the lever 15 at the position corresponding to the cassette of L size. The lever 15' is similarly moved, by symmetrically. As mentioned above, with the cam structures arranged on the levers 15, 15', the construction of the shift regulating means can be simplified and compacted, and more positive regulating operation can be presented.

Alternatively, as the shift regulating means, in place of the structure mentioned above, for example, elastic members such as spring 22 and 22' fixed along the edges of the guide slots 12 and 12' may be used, as shown in FIG. 17 (the spring 22 is provided along the guide slot 12, but is not shown in FIG. 17). With this arrangement, the springs 22, 22' abut against the outer peripheral surfaces of the rollers 21, 21' on the ends of the levers 15, 15', and such rollers 21, 21' are urged toward the respective V-shaped notches 30, 30' by the action of the springs 22, 22'. The springs 22, 22' shown in FIG. 17 are provided with projections in longitudinal direction thereof so that they can abut against the rollers 21, 21' when these rollers are positioned in the V-shaped notches 30, 30' or thereabout. With such arrangement, the construction of the shift regulating means can be simplified considerably. According to this embodiment, the reel supports can be positively shifted, positioned and held with a simple and compact mechanism. Therefore, the VCR using such mechanism will be compact, lightweight and inexpensive.

In the embodiment described above, while the VCR using the three kinds of cassettes of L, M, S sizes has been described, it should be noted that the present invention is applicable to a VCR for two kinds of cassettes having different sizes. The positioning and holding mechanism may be provided on the side of the guide members. Further, particularly, in the construction for two kinds of cassettes having different sizes, the positioning and holding mechanism such as V-shaped notches as mentioned in connection with the previous embodiments may be dispensed with in the first guiding means and/or guide members at all. In addition, the present invention can be applied to a video tape recorder (VTR) using reels of so-called open-reel type, with the same construction, function and effect as using the reel cassettes.

According to the present invention, by using only a single motor, the shifting structure including the reel supports can be easily and positively shifted to any position in corresponding to the diameter of the reels, the distance between the reels and/or the size of the cassette including the reels, and be positively positioned and held at the predetermined position. In particular, the mechanism for converting the rotation movement into the linear movement, comprising the worm wheels and the levers, is simple in construction and can easily provide the large driving force and be small-sized.

Further, any control mechanisms and solenoids for positioning the reel support bases are not required. Thus, the reel support shifting device itself can be compact, lightweight and inexpensive, and, accordingly, the magnetic recording apparatus using such shifting device can also be easily compact, lightweight and inexpensive.

Any other alterations and modification can be adopted without departure from the spirit and main features of the present invention. Accordingly, the illustrated embodiments described above are merely examples of the present invention, and do not limit the invention. The scope of the present invention is stipulated in the appended claims. Further, any alterations and modifications belonging to the equivalent scope of the claims are all included in the present invention.

What is claimed is:

1. A positioning device for positioning reel supports adapted to accommodate a pair of spaced reels having a tape-like recording medium wound thereon, the positioning device comprising:

shifting means for shifting said reel supports to a predetermined position and holding said reel supports in said predetermined position in dependence upon at least one of a diameter of said reels and a distance between said pair of reels;

a plurality of guide members fixedly provided on a stationary support of the positioning device and engageable by said shifting means for supporting said shifting means in a predetermined posture with respect to the stationary support and for guiding a movement of said shifting means with respect to the stationary support;

first guide means provided on said stationary support and including guide surfaces extending in parallel with a longitudinal axis of said guide member;

second guide means provided on said shifting means and including first guide surfaces each extending in a direction oriented at predetermined angles with respect to the longitudinal axis of the guide members and second guide surfaces overlapping guide portions of said first guiding means;

a plurality of operation member each having one end engaged by said first guide means and said second guide means for enabling each of said operation members to shift said shifting means along the respective guide members by moving and guiding said one end along said first guide means and said second guide means;

a plurality of rotary members adapted to be selectively rotated in a forward and a reverse direction for imparting turning movements to free ends of said operation members opposite the respective ends engaged by said first guide means and said second guide means;

pivot shaft means for respectively rotatably supporting said operation members on said rotary members;

supporting means for supporting said pivot shaft means at the respective rotary members, said supporting means being disposed in a plane perpendicular to a central axis of rotation of the respective rotary members and extending in a rotational direction of the respective rotary members to pass through a center of rotation of the respective rotary members, each of said supporting means including the first end connected through the respective pivot shaft means to the respective free ends of the respective operation members, said supporting means being adapted to rotate together with said rotary members upon the rotation thereof;

a plurality of elastic means respectively provided between the respective rotary members and associated supporting means, each of said elastic means having a first end connected to the respective rotary members and a second end connected to a free end of the associated supporting means, said elastic means being adapted to constantly apply elastic forces to said supporting means in radial directions of the respective rotary member; and a motor means connected to said rotary members for rotatably driving said rotary members.

2. A positioning device according to claim 1, wherein said first guide means comprises a positioning and holding mechanism including a notch formed in said first guide means in a longitudinal direction thereof.

3. A positioning device according to claim 2, wherein said notch formed in said first guiding means has a substantially V-shaped configuration, and wherein said V-shaped configuration is asymmetrical with respect to a bisector of a divergence angle of said notch.

4. A positioning device according to claim 1, wherein each of said rotary members includes a worm wheel connected to an output shaft of said motor means.

5. A positioning device according to claim 1, wherein said second guide means provided on said shifting means are separate from said reel supports.

6. A positioning device according to claim 1, wherein said first guide means each includes a guide slot extending in a longitudinal direction of the respective guide members.

7. A positioning device according to claim 2, wherein said first guide means each includes a guide slot extending in a longitudinal direction of the respective guide members.

8. A positioning device according to claim 1, wherein said second guide means each includes a slot oriented at a predetermined angle with respect to a longitudinal direction of said guide members.

9. A positioning device according to claim 2, wherein said second guide means each includes a slot oriented at a predetermined angle with respect to a longitudinal direction of said guide members.

10. A positioning device according to claim 1, wherein said supporting means are each reciprocably and linearly shifted in radial directions of the respective rotary members on surfaces thereof in response to rotational movement of the respective rotary members.

11. A magnetic recording apparatus including the positioning device according to claim 1.

12. A magnetic recording apparatus including a positioning device according to claim 9.

13. A positioning device for positioning reel supports adapted to accommodate a pair of spaced reels having a tape-like recording medium wound thereon, the positioning device comprising:

shifting means for shifting said reel supports to a predetermined position and holding said reel supports in said predetermined position in dependence upon at least one of a diameter of said reels and a distance between said pair of reels;

a plurality of guide members fixedly provided on a stationary support of the positioning device and engageable by said shifting means for supporting said shifting means in a predetermined posture with respect to the stationary support and for guiding a movement of said shifting means with respect to the stationary support;

a plurality of first guide means provided on the stationary support and including a guide surface extending in parallel with a longitudinal axis of said guide members, said first guide means respectively further including stopping, positioning and holding means provided at an intermediate portion of said guide surface at a position corresponding to the distance between said reels;

second guide means provided on said shifting means and including first guide surfaces each extending in a direction oriented at predetermined angles with respect to the longitudinal axis of the guide members and second guide surfaces overlapping guide portions of said first guiding means;

a plurality of operation members each having one end engaged by said first guide means and said second guide means for enabling each of said operation members to shift said shifting means along the respective guide members by moving and guiding said one end along said first guide means and said second guide means;

a plurality of rotary members adapted to be selectively rotated in a forward and a reverse direction for imparting turning movements to free ends of said operation members opposite the respective ends engaged by said first guide means and said second guide means;

pivot shaft means for respectively rotatably supporting said operation members on said rotary members;

supporting means for supporting said pivot shaft means at the respective rotary members, said supporting means being disposed in a plane perpendicular to a central axis of rotation of the respective rotary members and extending in a rotational direction of the respective rotary members to pass through a center of rotation of the respective rotary members, each of said supporting means including the first end connected through the respective pivot shaft means to the respective free ends of the respective operation members, said supporting means being adapted to rotate together with said rotary members upon the rotation thereof;

a plurality of elastic means respectively provided between the respective rotary members and associated supporting means, each of said elastic means having a first end connected to the respective rotary members and a second end connected to a free end of the associated supporting means, said elastic means being adapted to constantly apply elastic forces to said supporting means in radial directions of the respective rotary member; and shift regulating means respectively engageable by one of longitudinally intermediate and end portions of the respective operation members and including a regulating member adapted to abut against the respective operation members, said regulating member being fixed to the stationary support and being adapted to apply a regulating force to the respective operation member through a regulated portion of the operating member in such a manner that a free end of said operation member is urged against the guide surface of the first guide means; and a motor means connected to said rotary members for rotatably driving said rotary members.

14. A positioning device according to claim 13, wherein said stopping, positioning and holding means includes a substantially V-shaped notch formed in a longitudinal side surface of said first guide means.

15. A positioning device according to claim 14, wherein said substantially V-shaped notch is asymmetrical with respect to a bisector a divergence angle of said notch.

16. A positioning device according to claim 13, wherein each of said rotary members includes a worm wheel connected to an output shaft of said motor means.

17. A positioning device according to claim 13, wherein said second guide means provided on said shifting means are separate from said reel supports.

18. A positioning device according to claim 13, wherein each of said first guide means includes a guide slot extending in a longitudinal direction of said guide members.

19. A positioning device according to claim 14, wherein each of said first guide means includes a guide slot extending in a longitudinal direction of said guide members.

20. A positioning device according to claim 13, wherein said second guide means each includes a slot oriented at a predetermined angle with respect to a longitudinal direction of said guide members.

21. A positioning device according to claim 19, wherein said second guide means each includes a slot oriented at a predetermined angle with respect to a longitudinal direction of said guide members.

22. A positioning device according to claim 13, wherein said shift regulating means comprise cam means formed in a longitudinal end surface of the respective operation member and said regulating members are arranged in front of said cam means and abut against the latter.

23. A positioning device according to claim 22, wherein said regulating members each comprise a roller arranged forwardly of said cam means and rotatably mounted on a fixed shaft.

24. A positioning device according to claim 21, wherein said shift regulating means comprises cam means formed in a longitudinal end surface of the respective operation members, and wherein said regulating members are arranged forwardly of said cam means and are rotatably mounted on a fixed shaft.

25. A positioning device according to claim 13, wherein each of said regulating members comprises cam means including cam portions arranged at least at two spaced positions.

26. A positioning device according to claim 21, wherein each of said regulating members comprises cam means including cam portions arranged at least at two spaced positions.

27. A positioning device according to claim 13, wherein each of said regulating members comprises an elastic body.

28. A positioning device according to claim 21, wherein each of said regulating members comprises an elastic body.

29. A positioning device according to claim 13, wherein said supporting means are each reciprocably and linearly shifted in radial directions of the respective rotary members on surfaces thereof in response to rotational movement of the respective rotary members.

30. A positioning device according to claim 22, wherein said supporting means are each reciprocably and linearly shifted in radial directions of the respective rotary members on surfaces thereof in response to rotational movement of the respective rotary members.

31. A magnetic recording apparatus including the positioning device according to claim 13.

32. A magnetic recording apparatus including the positioning device according to claim 22.

* * * * *